(12) United States Patent
Shen

(10) Patent No.: US 7,036,970 B2
(45) Date of Patent: May 2, 2006

(54) OPTICAL FIBER LAYOUT OF LIGHT DECORATIVE OBJECT

(76) Inventor: I-Tsung Shen, P.O. Box No. 6-57, Junghe, Taipei 235 (TW)

( * ) Notice: Subject to any disclaimer, the term of this patent is extended or adjusted under 35 U.S.C. 154(b) by 181 days.

(21) Appl. No.: 10/736,670

(22) Filed: Dec. 17, 2003

(65) Prior Publication Data

US 2005/0135114 A1    Jun. 23, 2005

(51) Int. Cl.
*A47G 35/00* (2006.01)
*E04D 13/00* (2006.01)

(52) U.S. Cl. .................. 362/561; 362/576; 362/806

(58) Field of Classification Search ............... 362/565, 362/551, 554, 576, 145, 806, 556, 555, 558, 362/566, 567, 568, 582, 148, 150, 253, 396
See application file for complete search history.

(56) References Cited

U.S. PATENT DOCUMENTS 6,739,745 B1 *   5/2004   Valdes ................. 362/554

* cited by examiner

*Primary Examiner*—John Anthony Ward
*Assistant Examiner*—Bao Q. Truong
(74) *Attorney, Agent, or Firm*—Troxell Law Office, PLLC

(57) ABSTRACT

An optical fiber layout of light decorative object, in that the layout is for simulating illuminating accumulated snow in a decorative object, includes a house, a separate roof covering a top portion of the house, and an optical fiber strip formed by a plurality of optical fiber threads and clamped between the house and the roof. The invention is characterized that, a light curtain is exposed at a bent end portion of the optical fiber strip for simulating glittering effects of an icicle screen of the decorative object.

3 Claims, 11 Drawing Sheets

OPTICAL FIBER LAYOUT OF LIGHT DECORATIVE OBJECT

BACKGROUND OF THE INVENTION (a) Field of the Invention

The invention relates to an optical fiber layout of decorative object, and more particularly, to an optical fiber layout for simulating icicles in a decorative object. The invention utilizes a plurality of joined optical fiber threads to form an illuminating optical fiber strip. The optical fiber strip is fastened by the decorative object using clamping method, with a bent end portion forming a drooping light curtain. A simulation of a radiating icicle screen is completed using illumination from the light curtain.

(b) Description of the Prior Art

Optical fiber threads are characterized as being flexible, light transmissive, small in diameter and capable of forming bright light spots at emitting terminals for creating various illumination effects. Therefore, optical fiber threads are extensively applied in decorative objects.

Referring to FIGS. 1 and 2, a prior optical fiber layout of a model house is for decorating a house 1 having a roof 11. To simulate effects of accumulated snow 12 in winter, the roof 11 is provided with appearance as accumulated snow 12 at a surface of the roof 11.

A prior light decorative object exposes emitting terminals 33 of optical fiber threads merely at positions of linear edges of the eaves 14. By arranging a plurality of emitting terminals 33, a linear light emitting line is formed. Using a light source, linear light streams are created by the emitting terminals 33.

Referring to FIG. 2, according to the prior invention, each linear edge of the eaves 14 of the roof 11 is devised with a plurality of arranged through holes 16. Each through hole 16 is inserted with an optical fiber thread 31 having an emitting terminal 33 thereof located at an outer opening of the through hole 16. An incoming terminal 32 is formed by collecting one end of the plurality of optical fiber threads 31 into a bundle. The incoming terminal 32 is for accepting light beams coming from an illuminating object 21 of a light source device 2 and transmitting the light beams to the emitting terminals 33. The light source device 2 is disposed with a grating 23 for changing waves and hues of light beams from the illuminating object 21. The grating 23 is driven and rotated by a motor 22 in order to vary spectra and waves, thereby enabling the emitting terminals 3 to give light decorative effects with radiances having different brightness.

However, the prior decorative object only has illumination effects at the emitting terminals 33, and is merely capable of forming linear radiations instead of three-dimensional illumination effects. In addition, to realize the layout of the optical fiber threads 31, it is necessary to first provide a plurality of transverse through holes 16, and then individually place the emitting end 33 of the optical fiber threads 31 at the through holes 16. To stabilize the entire structure, glue means is likely adopted. Yet, glue means easily incurs contamination at surfaces of the emitting terminals 33 to further block light beams. Supposed the house 1 is manufactured from polyester materials using a centrifugal rolling method, a mold formed is easily deformed and damages due to excavating the transverse through holes.

Furthermore, in the prior invention, light beams emitted by the emitting terminals 33 are straight-line projected outward along axes of the optical fiber threads without reaching the house. The light spots are much brighter compared with luminance of the surface of the house not being illuminated, and therefore the decorative object may lack overall aesthetic values for the housing has unsatisfactory luster.

From the above descriptions, it is observed that the prior optical fiber layout of decorative object has complicated procedures with the mold being liable to damages. Not only labor and equipment costs are increased, but also production speed is slowed down. After assembly, the optical fiber threads cannot be smoothly removed for easy repair. Also, light streams are straight-line projected from the emitting terminals 33 instead of projecting upon walls of the house. All of the above issues are considered as shortcomings of the prior invention.

SUMMARY OF THE INVENTION

Therefore, the primary object of the invention is to provide an optical fiber layout of light decorative object, in that a house and a roof of the light decorative object are separate individuals. Using clamping means, a joined optical fiber strip is fastened, such that a bent end portion of the optical fiber strip forms a drooping light curtain. Through illumination from the light curtain, radiation of surfaces of an icicle screen is simulated and three-dimensional illuminating effects are accomplished.

DETAILED DESCRIPTION OF THE PREFERRED EMBODIMENTS

To better understand the invention, detailed descriptions of preferred embodiments shall be given with the accompanying drawings below.

Figure 1:
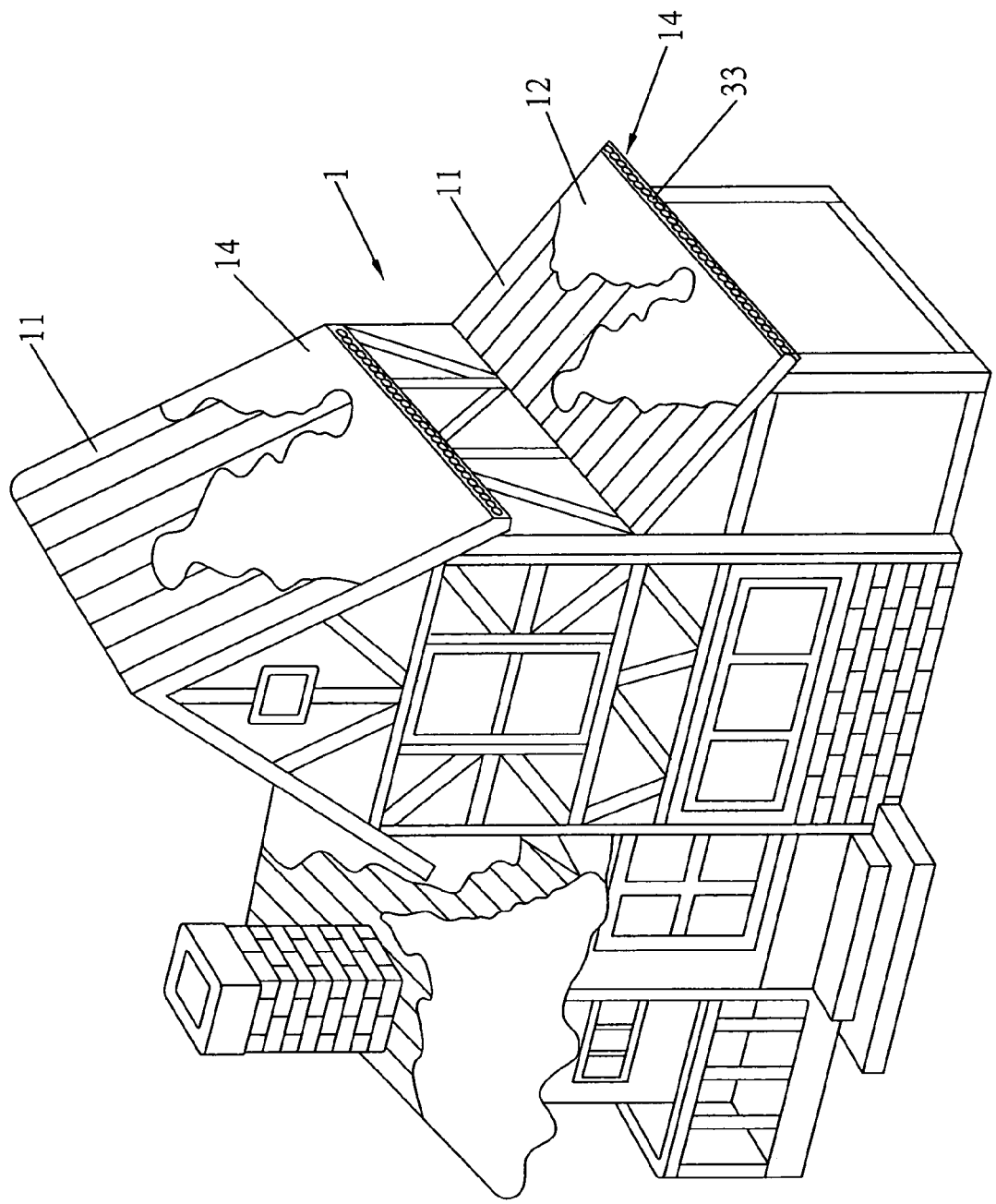
FIG. 1 shows a perspective view of a light decorative object.
Figure 2:
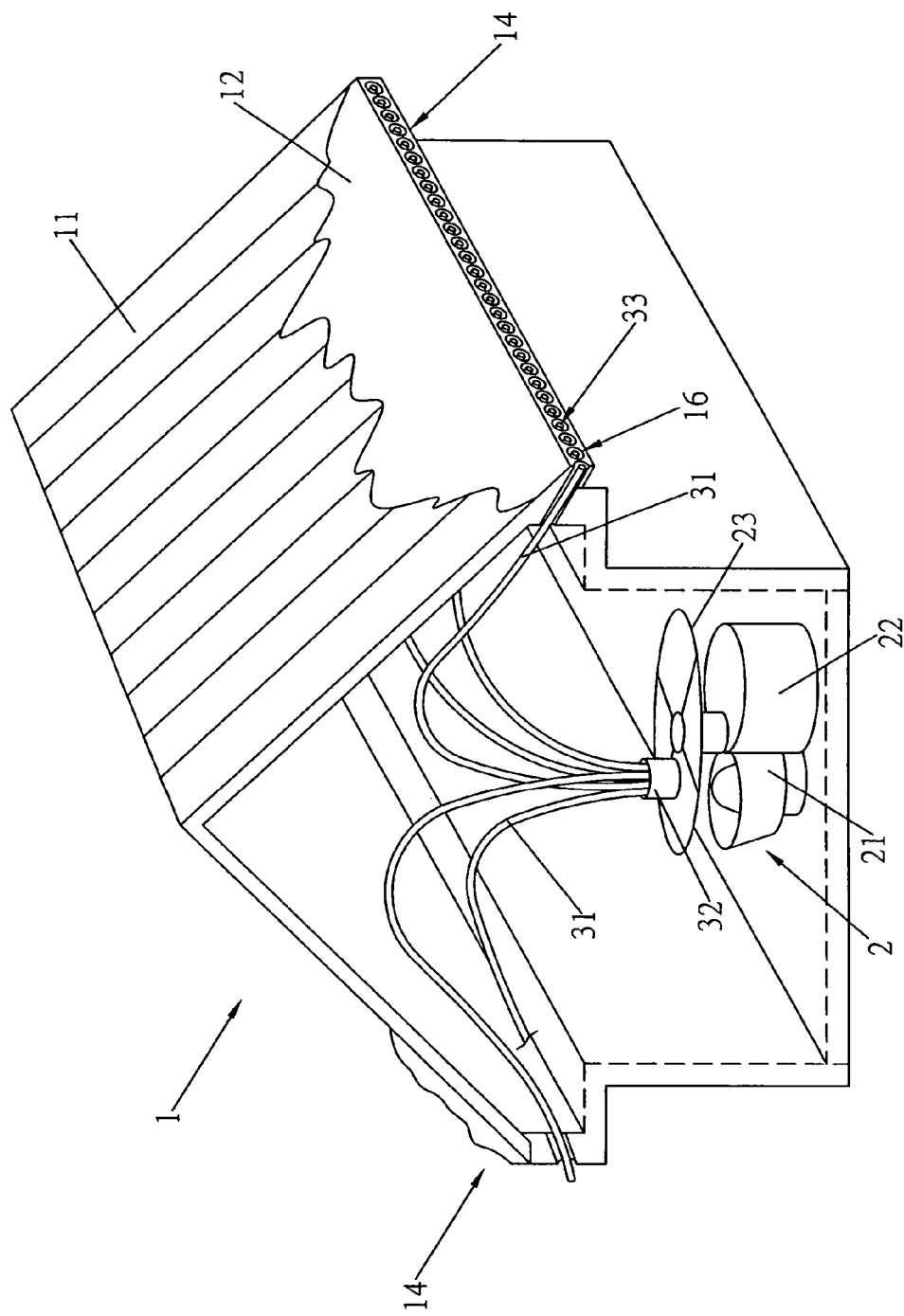
FIG. 2 shows a structural schematic view of a prior optical fiber layout of light decorative object.
Figure 3:
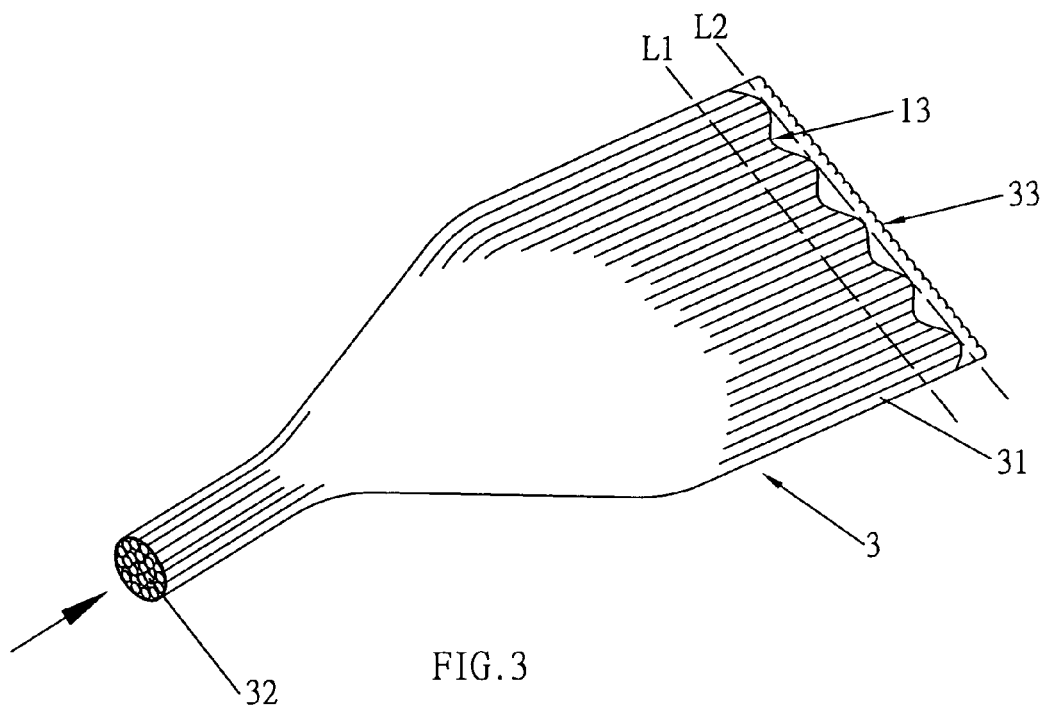
FIG. 3 shows a schematic illustrating an arrangement of an optical strip for optical fiber illumination according to the invention.

With reference to FIG. 3, a plurality of optical fiber threads 31 is arranged side by side to form a plane-like optical fiber strip 3. The optical fiber threads 31 have one ends thereof gathered as an incoming terminal 32, and the other ends as emitting terminals 33. The emitting terminals 33 may be devised with a bending line L1 or a trimming line L2. The trimming line L2 is a simulation of a curve of a lower edge line 13. The optical fiber strip 3 is joined with a cloth strip by gluing or spreading to the cloth strip.

Figure 4:
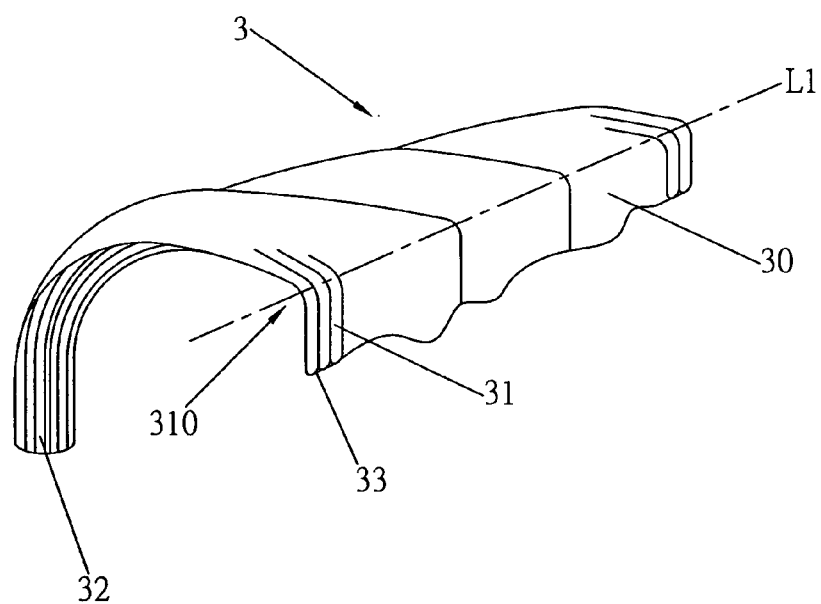
FIG. 4 shows an illuminating optical fiber strip being prepared in advance in an embodiment according to the invention.

Referring to FIG. 4, by being a plastic and flexible material, the optical fiber threads 31 can be easily cut and bent to form an angle 310 in conjunction with the bending line L1, and trimmed with a curve edge (the lower edge line 13). A vertical light curtain 30 is formed at the bent end portion, with the lower edge line 13 of the light curtain 30 forming the emitting terminals 33. According to the invention, the optical fiber threads 31 used are plastic optical fiber threads having transmission attenuation between 200 and 300 db/km. The optical fiber strip 3 is formed by placing the optical fiber threads 31 side by side, and has the incoming terminal 32 formed by gathering one end thereof into a bundle.

Figure 5:
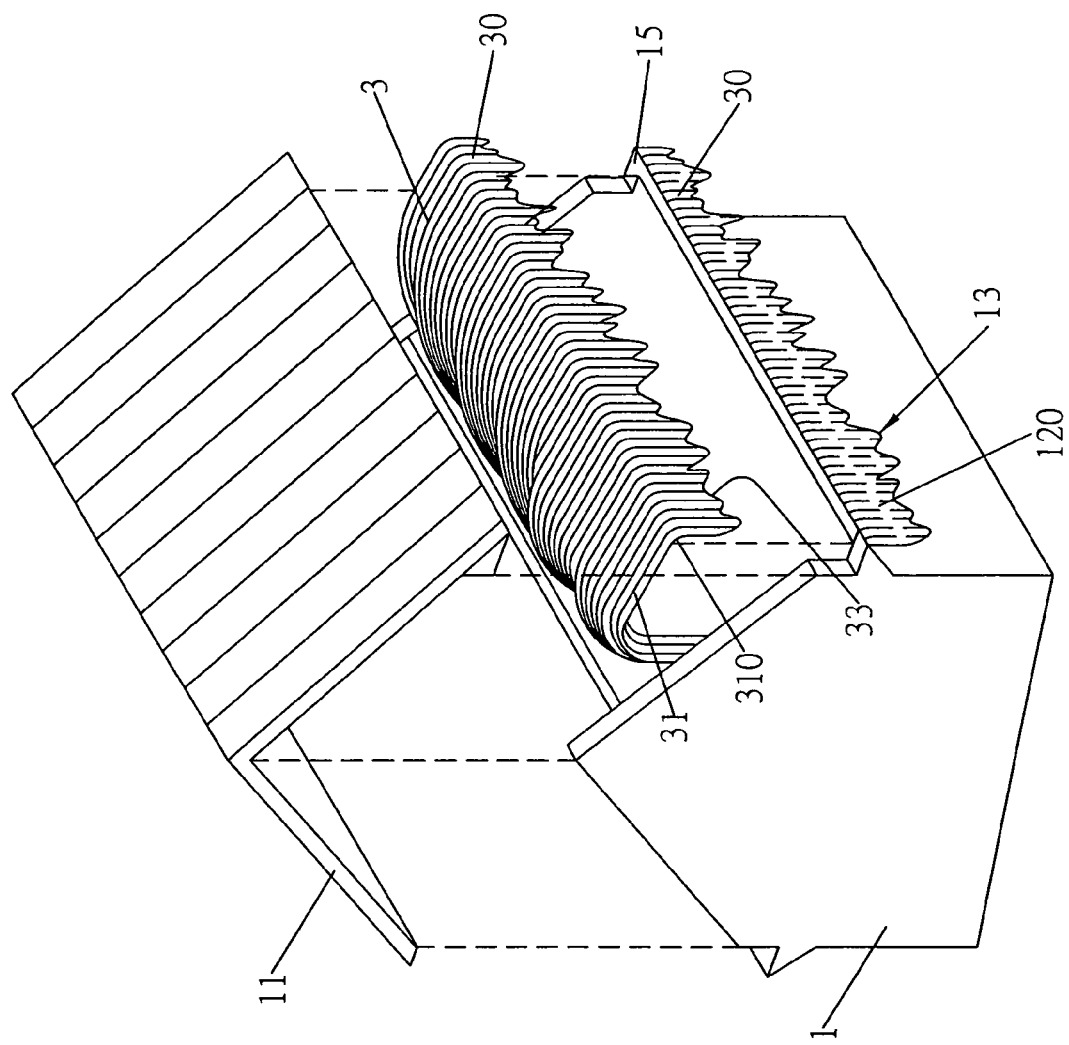
FIG. 5 shows a schematic view illustrating an application according to the invention.

The light decorative object in an embodiment according to the invention is applicable in any light decorative objects ranging from three-dimensional to two-dimensional structures having icicle shapes including Christmas trees, Christmas hats or shoes. The light decorative object according to the invention can simulate icicle shapes with glittering effects, and a house decorative object is to be used as an embodiment below. Referring to FIG. 5 for an optical fiber layout according to the invention, a house 1 is covered by a separate roof 11 above. A plurality of optical fiber threads 31 is arranged sided by side to form an optical fiber strip 3 as shown in FIG. 4. The optical fiber strip 3 is hung at eaves 15 using the angle 310, and the light curtain 30 formed is located right below the eaves 15. Through light transmission, radial light beams are emitted from light streams via the light curtain 30 of the optical fiber strip 3, which becomes illuminated as a simulation of an icicle screen 120. Because the drooping light curtain 30 projects light beams radially in forward and backward directions, side partial light beams are projected onto walls or corridors of the house to assist illumination. In addition, spotted light is formed at the emitting terminals 33 of the lower edge line 13 to gather and display as curved illumination. Light streams emitted by the emitting terminals 33 are also projected onto the walls and ground surfaces.

Figure 6:
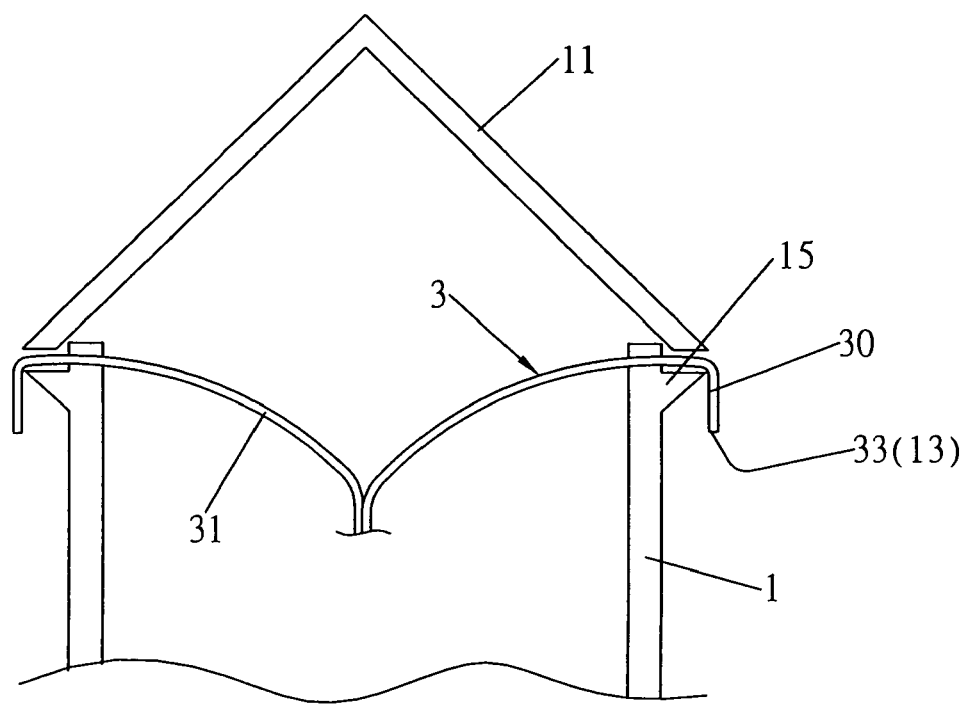
FIG. 6 shows a side view according to the invention.

Referring to FIG. 6, the optical fiber strip 3 is clamped by the roof 11 and the house 1. The emitting terminals 33 of the optical fiber threads 31 form a bright spotted configuration at the lower edge line 13 in a gathered manner. The light curtain 30 emits light streams as sideward light sources using radial attenuation of the optical fiber threads 31, so as to obtain light decorative effects as a simulated icicle screen. The light streams emitted sideward can be combined as three-dimensional and omni-directional light beams, which can illuminate surfaces of neighboring decorative objects such as walls below the eaves or corridors.

Figure 7:
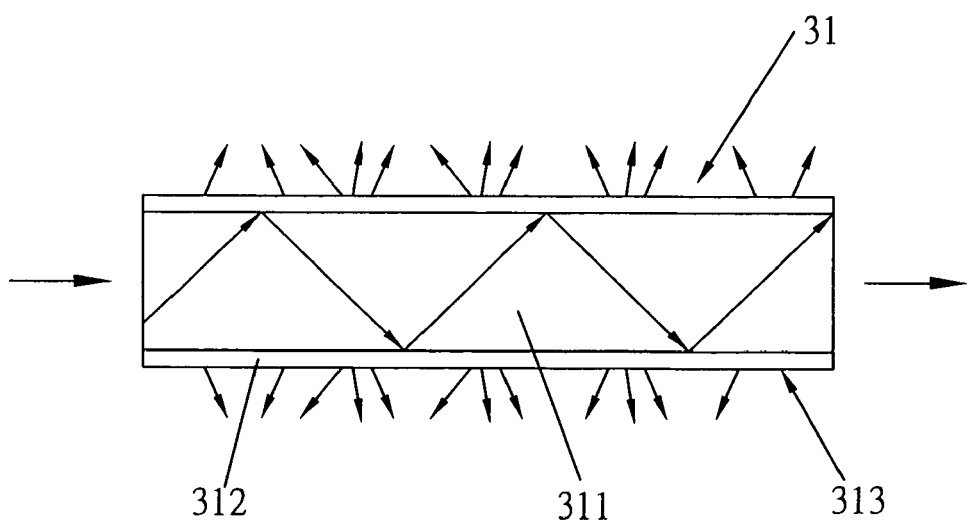
FIG. 7 shows a diagram illustrating transmission attenuation of optical fiber.

Referring to FIG. 7, the optical fiber threads 31 are plastic materials having relatively higher attenuation, and hence light streams transmitted by cores 311 thereof are leaked through surfaces 313 thereof. The light leakage is due to a reflecting layer 312 being incapable of total internal reflection with attenuation produced as a result, and incoming light streams are radially attenuated in various angles. Using such attenuation, radial light streams (lateral light beams at the surfaces of the optical fiber strip 3) from the optical fiber threads 31 are obtained. Thus, attenuated beams are observed at the lateral surfaces of the optical fiber threads 31 to further simulate effects of accumulated snow.

Figure 8:
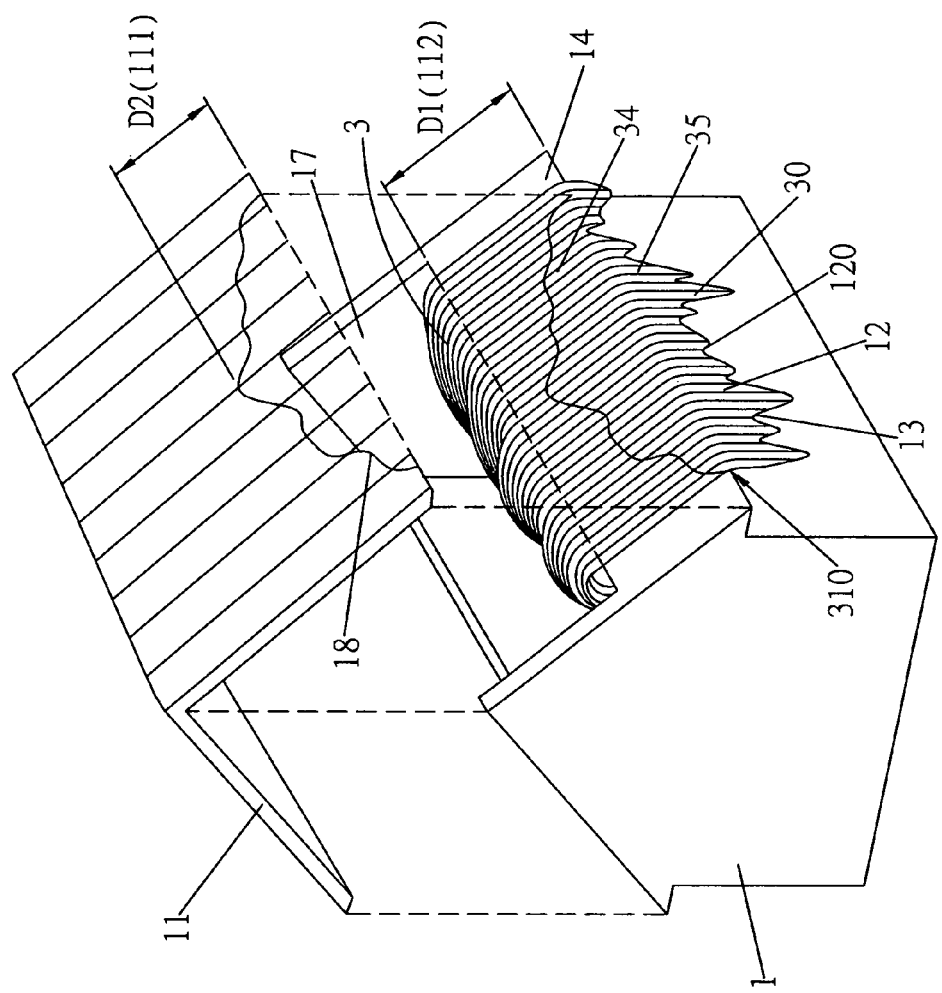
FIG. 8 shows another embodiment according to the invention.

Referring to FIG. 8 showing an embodiment simulating lumps of accumulated snow with glittering effects, the house 1 is reserved with a supporting plane 112 at a top portion thereof. The supporting plane 112 has a length of D1, and is corresponding to an open section 111 excavated at the roof 11. The open section 111 is defined by an upper edge curve 18 formed by an upper edge of the simulated snow 12. The optical fiber strip 3 is connected with a light source in the house 1 via an opening 17, and has an outer end thereof hung at the eaves 14, such that the angle 310 is located at the eaves 14. The optical fiber strip 3 is drooped to form an icicle light curtain 30 further constructing illumination application of the icicle screen 120.

Figure 9:
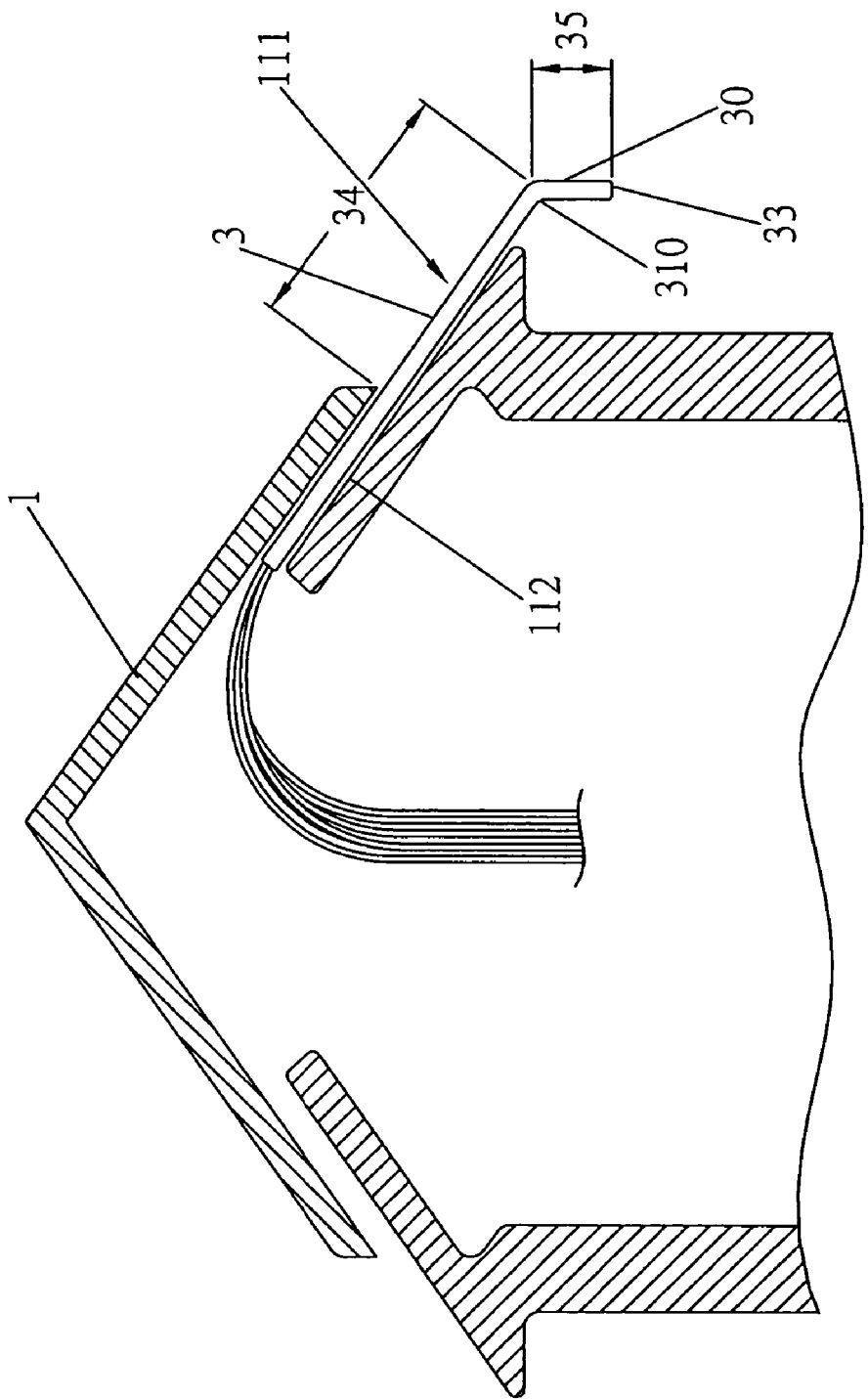
FIG. 9 shows a side view of the embodiment in FIG. 8.

Referring to FIGS. 8 and 9 showing the house 1 being closed, the open section 111 at the roof 11 is corresponded with the supporting plane 112, and the optical strip 3 is placed in between. Distinguished by the angle 310, the optical strip 3 is divided into an illuminating plane 34, and an illuminating plane 35 of the light curtain 30. Using the two illuminating planes 34 and 35, in conjunction with the upper curve 18 and the lower edge line 13, a simulation of accumulated snow 12 is completed. With light transmission, hallow light is produced at surfaces of the optical fiber strip 3 simulating the accumulated snow 12, thereby achieving simulated light decorative effects of accumulated snow. The light curtain 30 simulates glittering effects of the icicle screen 120, and along with the lower edge line 13, spotted linear radiating effects are formed at the emitting terminals 33 of the optical fiber strip 3. Similarly, projection angles of the emitting terminals 30 are adjustable, and hence light beams projected may be adjusted to serve in assisting illumination of walls or ground surfaces.

Figure 10:
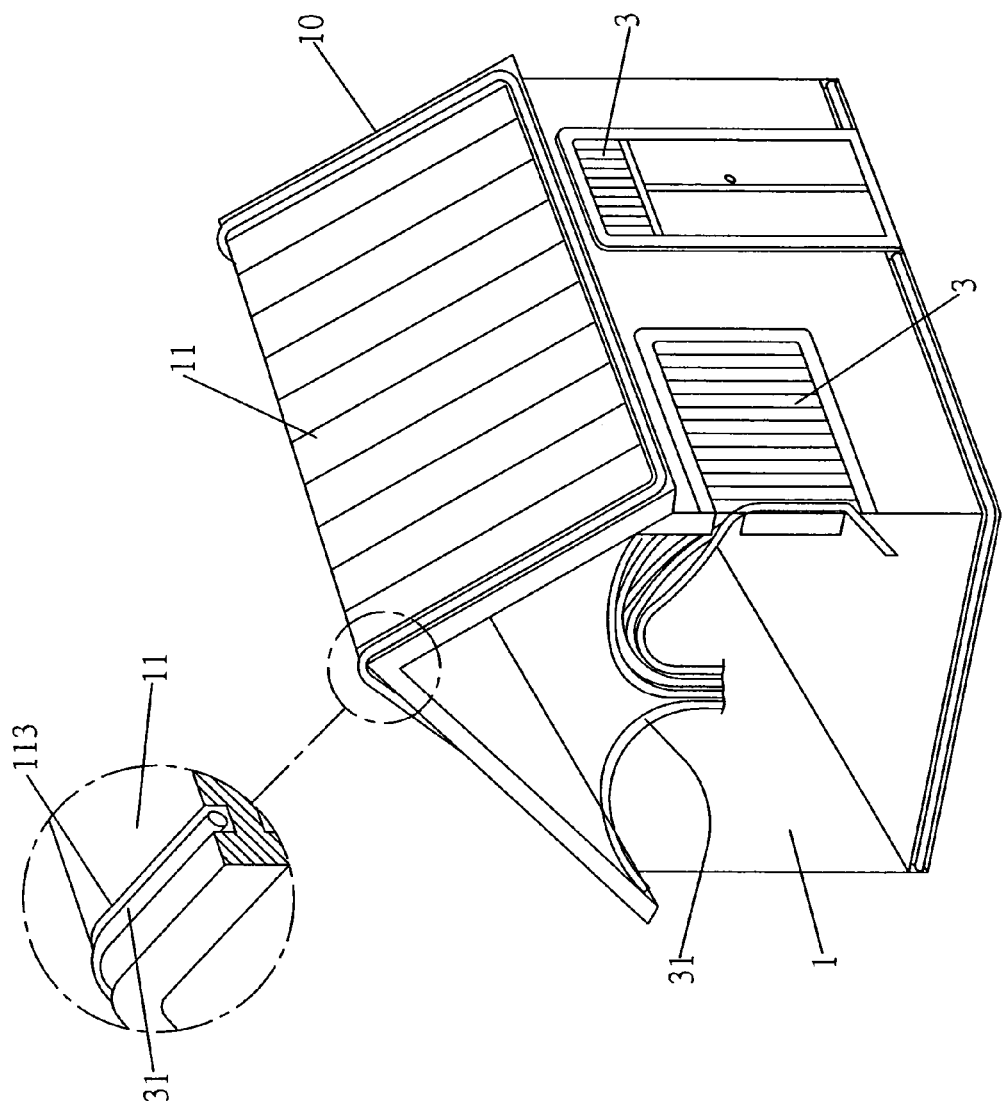
FIG. 10 shows another application diagram according to the invention.

Referring to FIG. 10, a middle portion of the optical fiber strip 3 is formed as a plane structure, which is devised at a windows or a door breadth of the house 1 to produce plane-like illumination. The plane-like illumination may be applied to walls or vertical planes, or any leveled and spread light decorative objects.

The optical fiber threads 31 are flexible in nature and can be easily bent, and therefore a single optical fiber thread or a few optical fiber threads can be arranged at an outline of the house 10.

To arrange the optical fiber threads 31 at the outline 10, the outline 10 is provided with a groove 113 for placing the optical fiber threads 31. Using radial light leakage and attenuation of the optical fiber threads 31, linear light beams are produced for enhancing light decorative effects of the outline 10 of the decorative object. Apart from the groove 113, the optical fiber threads 31 may also be attached to the outline 10 using wedging or adhering means.

Figure 11:
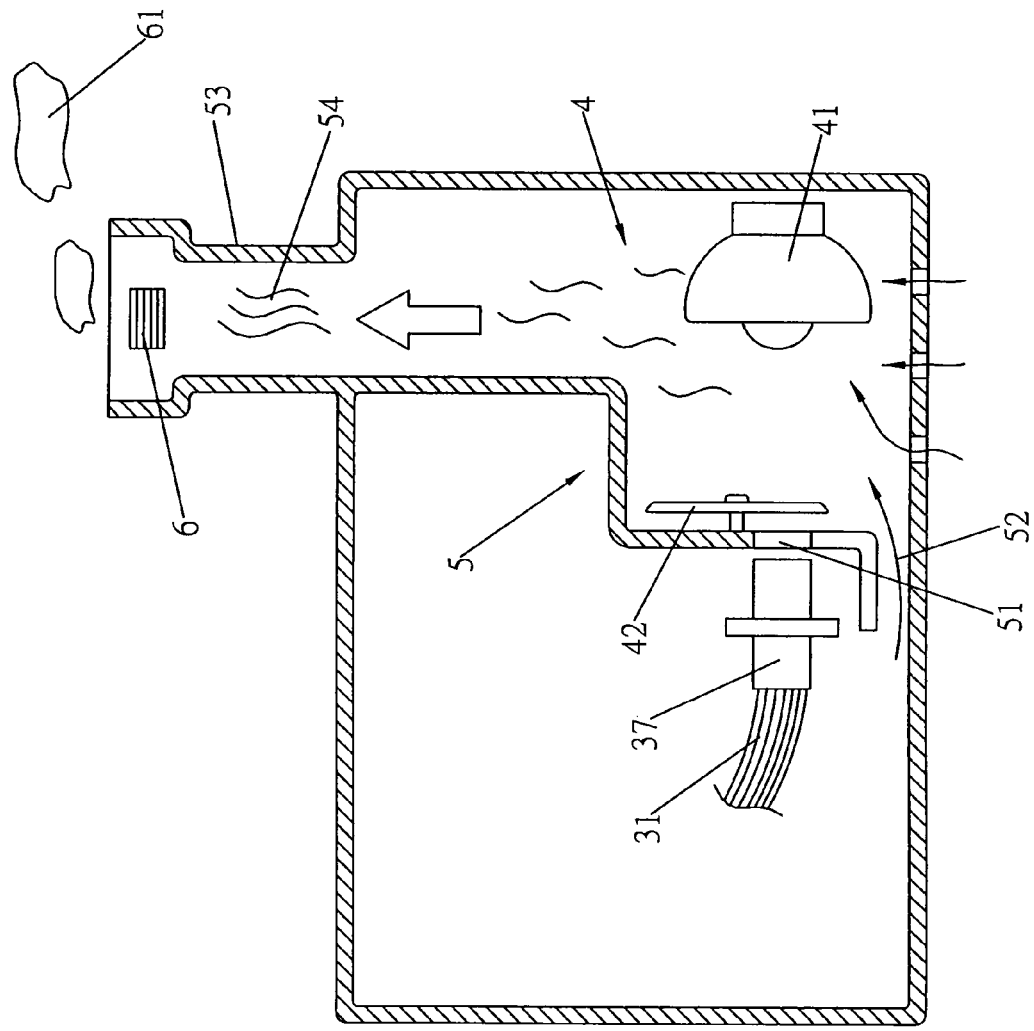
FIG. 11 shows a structural view of a light source in another embodiment according to the invention.

Referring to FIG. 11, a light source applied according to the invention may be an internal light source assembly 4. The light source assembly 4 has a light source body 41 located within a fireplace 5 in the decorative object. The fireplace 5 is extended with a chimney 53 having a flue 54 at an inner portion thereof. The fireplace 5 further has the light source body 41 at the interior thereof. Light streams of the light source body 41 are projected out of light openings 51 from a grating 42, and are passed on by a coupler 37 of the optical fiber threads 31.

Below the fireplace 5 is a ventilation opening 52, and thus thermal energy produced by operations of the light source body 41 is discharged via the flue 54 due to cold air induced by the ventilation opening 52 and rising property of heat. An outer opening of the chimney 53 is placed with an aromatizer 6 being a common aromatherapy essence or other oils reactive to heat. Through thermal energy 41 of the light source body 41, the aromatizer 6 is converted into smoke 61. Afterglow of the light source body 41 is discharged through the flue 54, with partial afterglow refracted upon the smoke 61 to obtain illuminating effects of the smoke 61.

Figure 12:
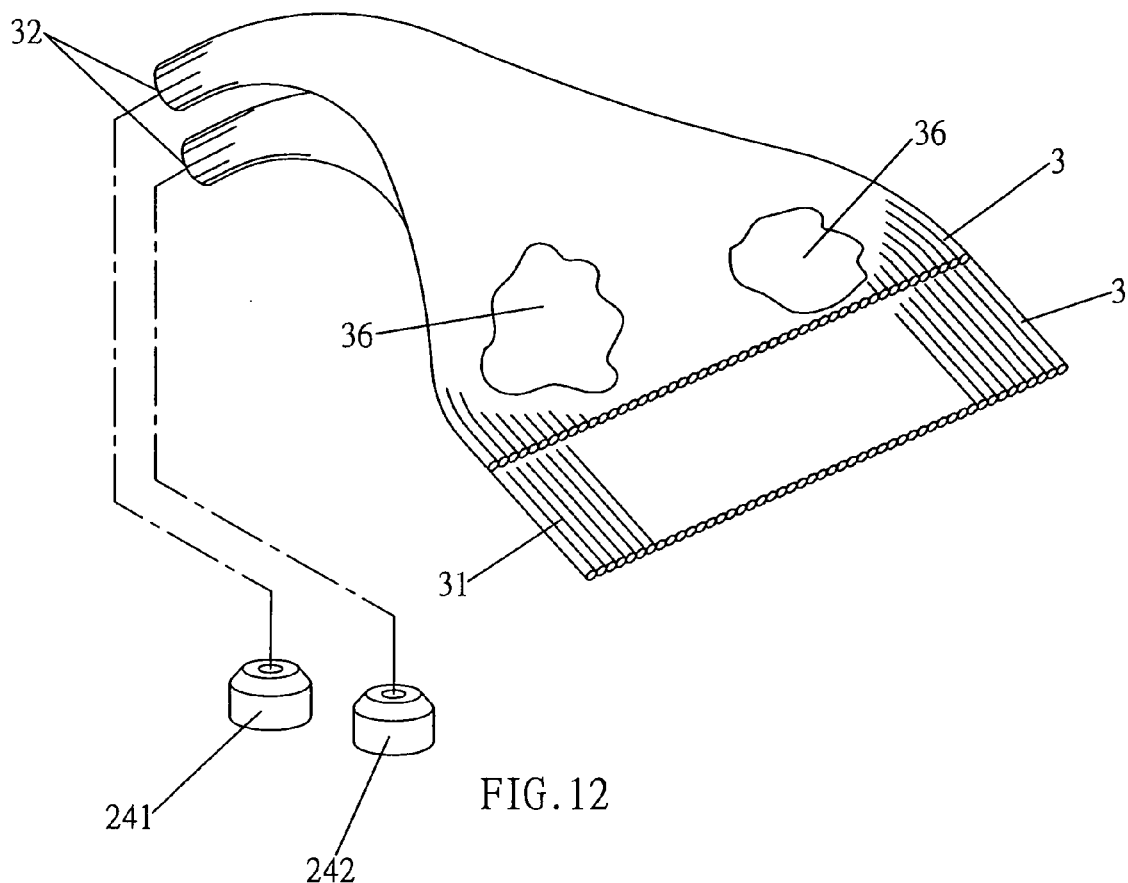
FIG. 12 shows an arrangement of optical fiber threads in another embodiment according to the invention.

Referring to FIG. 12, the optical fiber strip 3 formed by the plurality of optical fiber threads 31 may be arranged in layers to generate layered illuminating effects. In addition, the input terminals 32 are also allowed to accept different light sources 241 and 242. Thus, different hues and overlapped light waves are formed from the optical fiber strips 3 at upper and lower layers, thereby achieving assorted radiating beams.

Furthermore, to put radial light leakage effects of the optical fiber threads 31 as indicate in FIG. 7 to use, a portion of an area of the reflecting layer 312 shown in FIG. 7 can be damaged by external forces to form a light leakage plane 36. Large amounts of light beams are released by the light leakage plane 36, and appear as extremely contrasting light relative to the surfaces of the optical fiber threads 31. Therefore, the light leakage plane 36 formed by external forces imposed may be used to release light streams for simulating larger spots or cloud clusters, thereby obtaining layered light streams using a single layer of optical strip.

Figure 13:
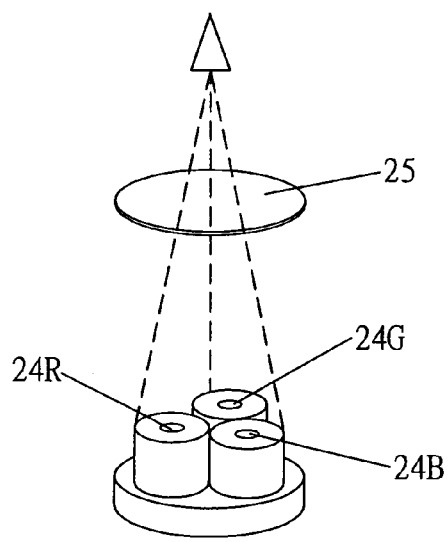
FIG. 13 shows a structural schematic view illustrating a full-spectrum light source being used according to the invention.

Referring to FIG. 13, the light source according to the invention may be consisted of three light source bodies 24R, 24G and 24B having basic light waves. The three light source bodies 24R, 24G and 24B are for producing three basic colors relative to a coaxial optical lens 25. Using a driving circuit to change lumen of each of the light source bodies 24R, 24G and 24B and interfering effects to one another, a colorful and constantly changing light source is created. Thus, the optical fiber threads are offered with the constantly changing colors to provide colorful light streams that can are transmitted to decorative objects, thereby generating kaleidoscopic light decorative effects.

Figure 14:
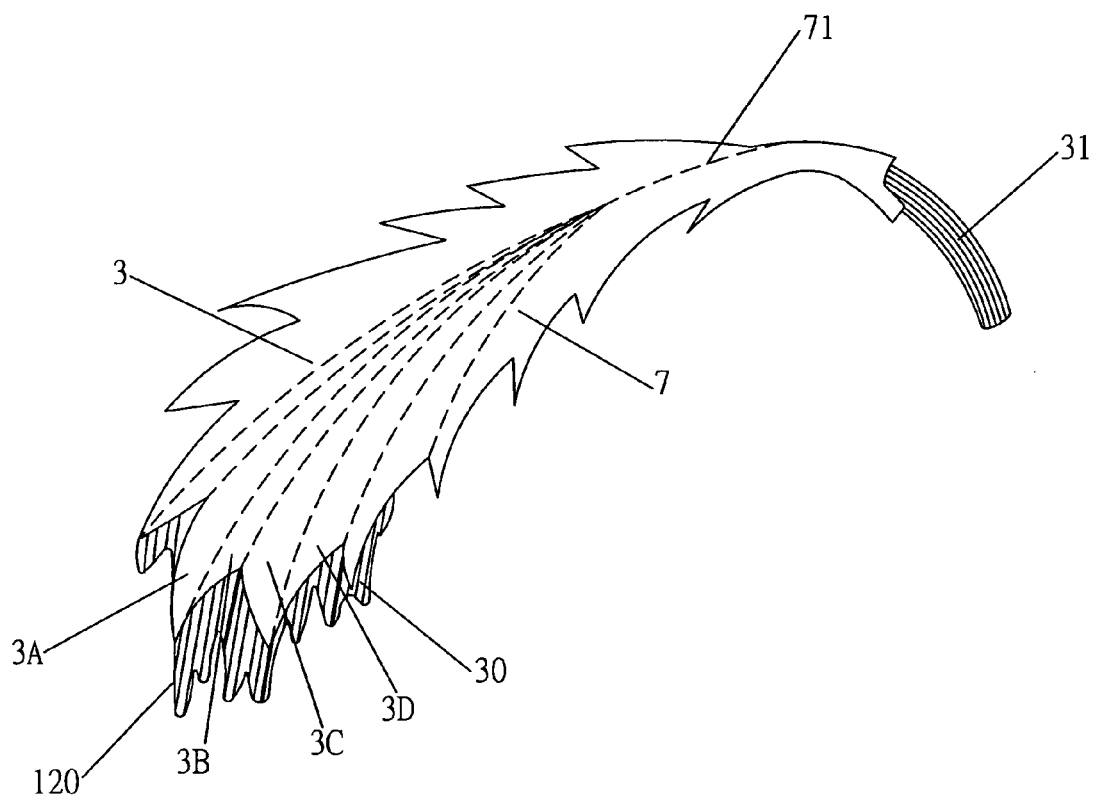
FIG. 14 shows an embodiment according to the invention completed by adhering means.

Referring to FIG. 14, the optical fiber strip 3 may be attached to a reverse side of a decorative object such as a leaf 7 by adhering means. The optical fiber threads 31 are gathered and inserted through a stem 71, with ends thereof distributed in pieces 3A, 3B, 3C, . . . according to a shape of the leaf 7, and are attached to the reverse side of the leaf 7 to approach an outline and edges of the leaf 7. According to the outline and angles, the ends of the optical fiber threads 31 are bent to form a light curtain 30, and illuminating effects of the icicle screen 120 are simulated by the drooped light curtain 30.

Figure 15:
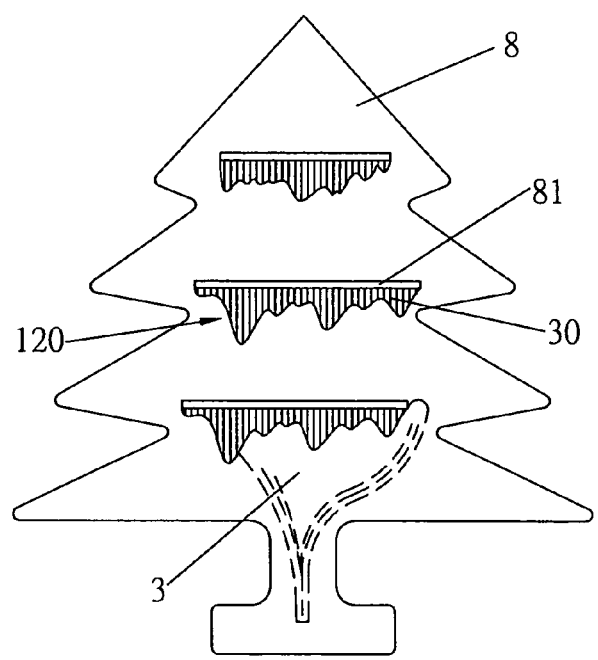
FIG. 15 shows an embodiment according to the invention completed by inserting means.

Referring to FIG. 15 showing an application to a plate-like decorative object such as a plate-like Christmas tree 8 provided with channels 81 in advance. The optical fiber strips 3 are guided back to an obverse side of a decorative plane, and the bent light curtains 30 are located at end portions of the channels 81 to expose vertical light curtains 30 for simulating glittering effects of the icicle screens 120. Contact planes of the drooping light curtains 30 relative to the Christmas tree 8 may be adhered and fastened to the Christmas tree 8.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. An optical fiber layout of light decorative object, in that the layout is for simulating illuminating accumulated snow in a decorative object, comprising a house having a light source assembly at an interior thereof, a separate roof covering a top portion of the house, and an optical fiber strip formed by a plurality of optical fiber threads and clamped between the house and the roof; and being characterized that, a light curtain is exposed at a bent end portion of the optical fiber strip for accepting transmitted light beams and simulating glittering effects of an icicle screen on the decorative object, wherein illuminating optical fiber strip can be devised as a plate-like structure formed by placing one on top of another.

2. An optical fiber layout of light decorative object, in that the layout is for simulating illuminating accumulated snow in a decorative object, comprising a house having a light source assembly at an interior thereof, a separate roof covering a top portion of the house, and an optical fiber strip formed by a plurality of optical fiber threads and clamped between the house and the roof; and being characterized that, a light curtain is exposed at a bent end portion of the optical fiber strip for accepting transmitted light beams and simulating glittering effects of an icicle screen on the decorative object, wherein a surface of the optical fiber strip is partially damaged to form a light leakage plane for providing large amounts of attenuated light streams, which five extremely contrasting illuminating effects relative to the surface of the optical fiber threads.

3. An optical fiber layout of light decorative object, in that the layout is for simulating illuminating accumulated snow in a decorative object, comprising a house having a light source assembly at an interior thereof, a separate roof covering a top portion of the house, and an optical fiber strip formed by a plurality of optical fiber threads and clamped between the house and the roof; and being characterized that, a light curtain is exposed at a bent end portion of the optical fiber strip for accepting transmitted light beams and simulating glittering effects of an icicle screen on the decorative object, wherein the optical fiber strip is inserted through a channel provided at a surface of a plate-like decorative object, with a bent end portion thereof forming a vertical light curtain adhered to the surface of the plate-like surface.

* * * * *